Jan. 11, 1966     L. E. BARWICK     3,229,025
AERIAL CABLE DEADENDING SYSTEM
Filed March 16, 1964     3 Sheets-Sheet 1

INVENTOR.
LEROY E. BARWICK
BY
Bernard J. Bischoff
ATTORNEY

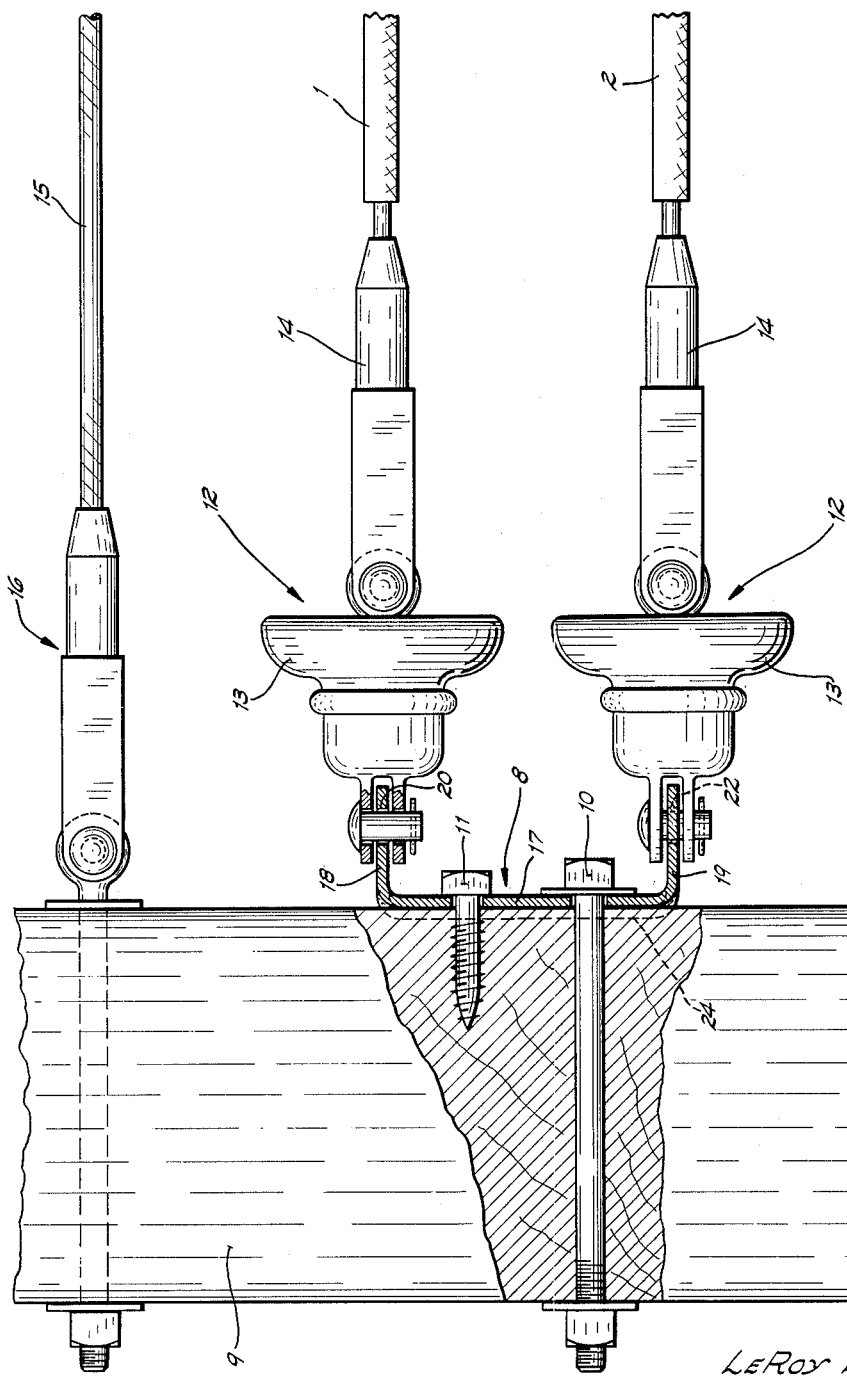

Jan. 11, 1966  L. E. BARWICK  3,229,025
AERIAL CABLE DEADENDING SYSTEM
Filed March 16, 1964  3 Sheets-Sheet 3
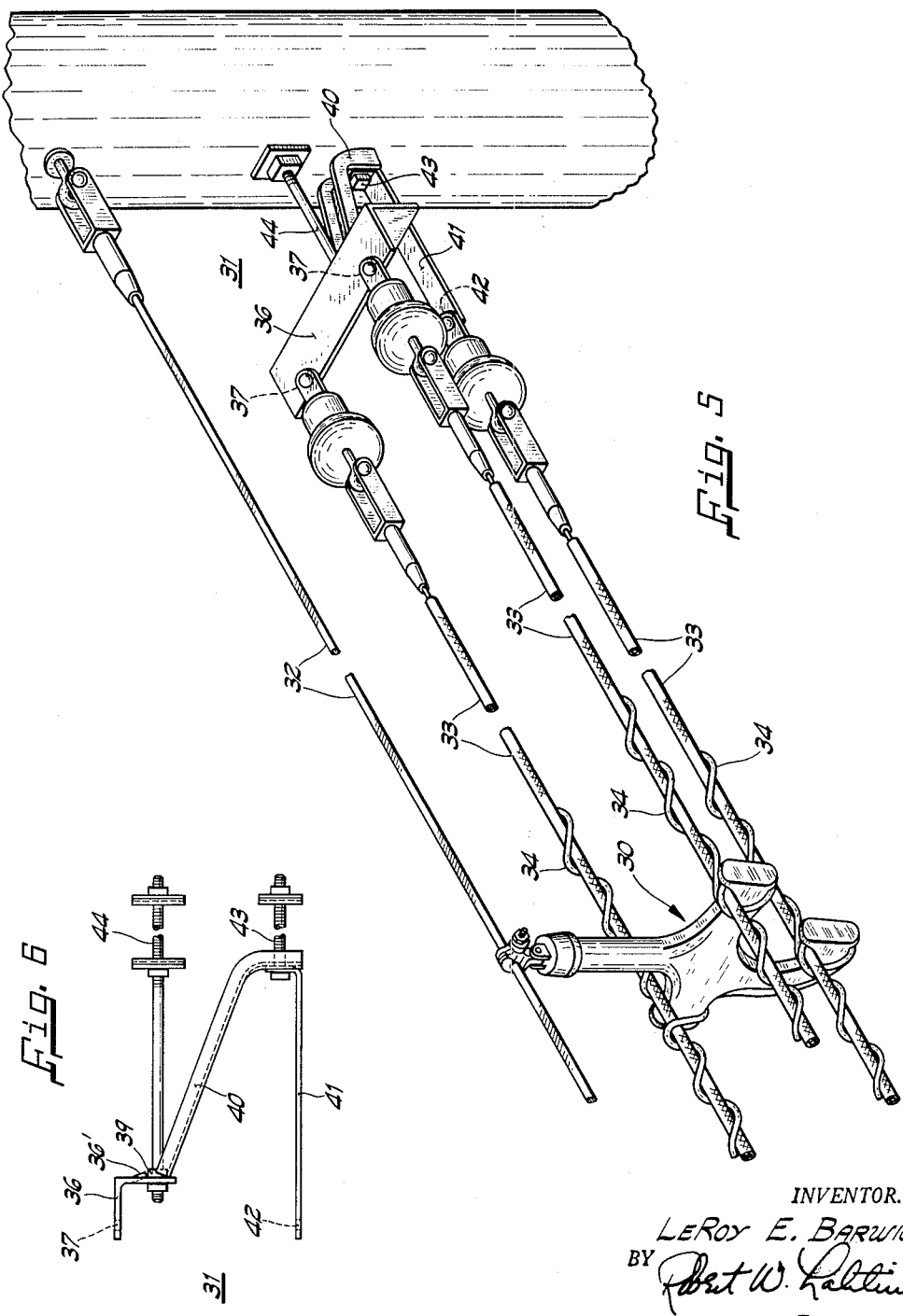
INVENTOR.
LEROY E. BARWICK
BY Robert W. Laltinen
ATTORNEY

United States Patent Office 3,229,025
Patented Jan. 11, 1966

3,229,025
AERIAL CABLE DEADENDING SYSTEM
Leroy E. Barwick, Milwaukee, Wis., assignor to McGraw-Edison Company, Milwaukee, Wis., a corporation of Delaware
Filed Mar. 16, 1964, Ser. No. 353,021
5 Claims. (Cl. 174—40)

This application is a continuation-in-part of my earlier filed application, Serial No. 45,837 filed July 28, 1960 and now abandoned.

This invention relates to aerial cable systems, and more particularly to means for deadending aerial cable.

Aerial cable systems utilize cable that is uninsulated or, more commonly, cable having insulation of lower rating than required for the power carried, accommodating such reduced insulation by using spacers at predetermined intervals to maintain a predetermined distance, or air gap, between the cables of the system. At the point of termination of the aerial cable system the cables pass through a final spacer and are deadended. The prior practice has been to deadend the three phase conductors of the cable system by causing them to diverge at the final spacer and be individually deadended in a spaced relation substantially greater than the spacing maintained between the conductors by the spacers of the system. Common practice has been to deadend the conductors on a crossarm, thereby changing both the spacing and the configuration. Since the terminal ends of the conductors are stripped of insulation and the electrically alive hardware which connects the conductors to the deadending points have inherently greater radial projection than the conductor, it has been accepted as necessary that the conductor be deadended at more widely spaced locations than established by the cable spacers to afford a greater air gap. Further, it was more convenient to tap into the end of the aerial cable system at the more widely spaced locations established by such deadending.

In service, the electrical conductors or cables of an aerial cable system are subjected to and must be capable of withstanding widely varying loads, both mechanical and electrical. Wind and ice loads on the electrical conductors can be substantial, and on occasion the electrical conductors may be called upon to carry high surges of current caused by faults which produce a violent whipping action of the conductors. The strain produced by the wind, ice or whipping when acting on the already stressed cable spacer often results in failure or complete destruction of the spacer, thereby destroying the uniform spacing of the electrical cables. Destroying even a single spacer usually results in adjacent cables of differing phase coming into contact to cause protective equipment to operate interrupting service.

It has been found that where an aerial cable system is subjected to severe loadings, such as fault currents, the greatest load exerted by the whipping action of the conductors is sustained by the spacer next adjoining the deadend with the result that this element of the system is the first to fail. The common practice of causing the conductors to diverge at the final spacer causes this spacer to be subjected to an initial structural strain that is additive to the load caused by a fault current, thereby reducing the ability of the system to resist the loading caused by a momentary fault.

The applicant has found that by maintaining the same spaced relation between the conductors of the system to the deadend point it causes the stresses exerted on the spacer adjoining the deadend to be reduced, and since this is the most vulnerable element in the system the ability of the entire system to withstand fault current loading is markedly improved. The stranded cable used in an aerial cable system is normally of such a size as to resist bending about a short radius so that when bending occurs due to severe load conditions the spacer which acts as a fulcrum must sustain a substantial loading. The insulation used on such cables is usually of two layers, an inner layer possessing good dielectric qualities and an outer layer that has a high resistance to abrasion. Such insulation, though of resilient nature, causes the overall cable to be stiffer and less readily bent, further increasing the load on the spacer. In a spaced conductor system using lightweight conductors the limiting factor is the ability of the individual conductor to sustain the abuse occasioned by the whipping action and the high heat generation of a fault current or other excessive loading, but in an aerial cable system using the more substantial conductor cables the mechanical adequacy of the spacer is the determining factor in the short circuit current rating of the entire system.

Another advantage of the applicant's system resides in the fact that when the conductors are maintained in parallel relation as taught by the applicant, a more efficient use of the pole results through elimination of the crossarm and minimizing the impairment of climbing space.

The same result cannot be achieved by using additional spacers at shorter intervals since the ability to resist fault currents is reduced if spacers are placed at intervals that cause the phase conductors to be too closely confined at the predetermined spacing. By way of example, when a desirable spacer frequency has been established, doubling the number of spacers and reducing the interval therebetween by half has actually caused the spacers to be destroyed at a level of fault current loading that could be sustained without injury to the system when the prior greater spacing was utilized with fewer spacers.

When deadending in a manner to maintain the same conductor spacing, it is necessary to use low profile hardware that presents a minimum radial projection to limit to the extent possible the reduction in the spacing between conductors of differing phase.

It is an object of this invention to deadend the electrical cables of an aerial cable system in such a manner as to maintain the spacing established by the cable spacers at the deadend point and thereby minimize the stresses to which the cable spacers are subjected.

This invention contemplates the provision of a bracket which is provided with suitable electrical conductor deadending points to which the electrical conductors may be attached. The deadending points are spaced relative to each other in accordance with the spacing of the electrical conductors which is established by the cable spacers, thereby maintaining the alignment of the electrical conductors through the cable spacers to the deadend bracket.

It is also an object of this invention to deadend an aerial cable system in a manner that will make optimum use of the associated pole by minimizing the reduction of climbing space.

These and other objects and advantages of my invention will be more evident from a reading of the following description in connection with the drawings in which:

FIG. 1 schematically illustrates an aerial cable spacer system in accordance with my invention;

FIG. 2 illustrates a typical deadend connection;

FIG. 5 is similar to FIG. 1, illustrating a second embodiment combining a spacer and deadend in accordance with my invention; and FIG. 6 is a side elevation of the deadend bracket of FIG. 5.

Figure 1:
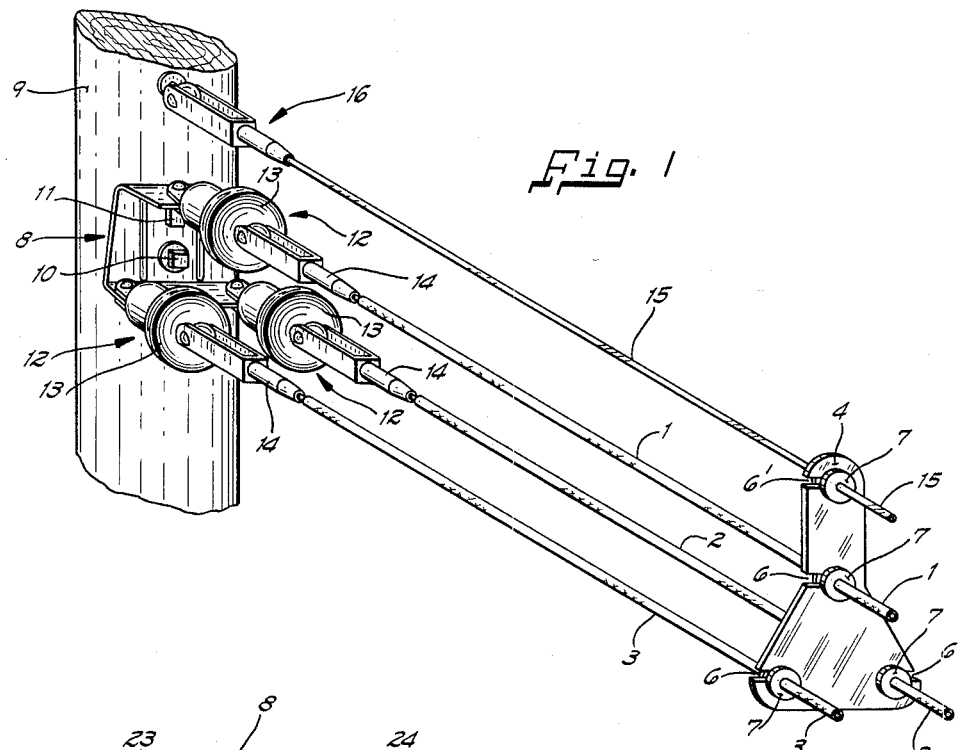

A portion of a typical aerial cable spacer system is illustrated in FIG. 1. More specifically, the electrical conductors of a 3-wire electrical distribution system pass through a cable spacer unit 4. The electrical conductors 1, 2 and 3 pass through suitable apertures 6 provided in the cable spacer 4 and are held in relative spaced relation. Preferably disposed in each of the apertures 6 and in frictional engagement with each respective electrical conductor is a rubber grommet 7 that holds the cable spaced 4 in fixed longitudinal position relative to the electrical conductors and prevents abrasion of the insulation on the electrical conductor. The spacer 4 establishes a spaced relationship between the electrical conductors 1, 2 and 3.

Completing the aerial cable system is a messenger cable 15 which passes through an aperture 6' in the cable spacer 4, which aperture is also provided with a suitable rubber grommet 7. The messenger cable 15 is suitably connected to the distribution pole 9, such as by deadending means 16. In stringing an aerial cable system such as illustrated in FIG. 1, generally the messenger cable 15 is strung first and the cable spacers 4 are hung therefrom at regularly spaced intervals. The electrical conductors 1, 2 and 3 are then suitably clamped in the cable spacer 4.

A bracket 8 is suitably attached to the distribution pole 9, such as by means of a through bolt 10, preferably located at the load center of the bracket, and a lag screw 11 which holds the bracket 8 against rotation. Suitable insulator assemblies 12 are provided to insulate the electrical conductors 1, 2 and 3 from the bracket 8. Each of the insulator assemblies 12 includes an insulator 13 suitably fixed to the bracket 8 and conductor receiving means 14.

Figure 4:
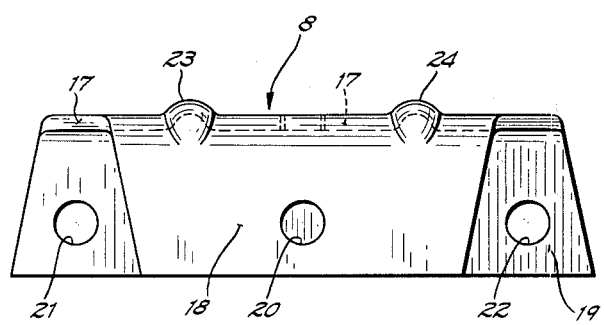
FIG. 4 is a top plan view thereof.
Figure 3:
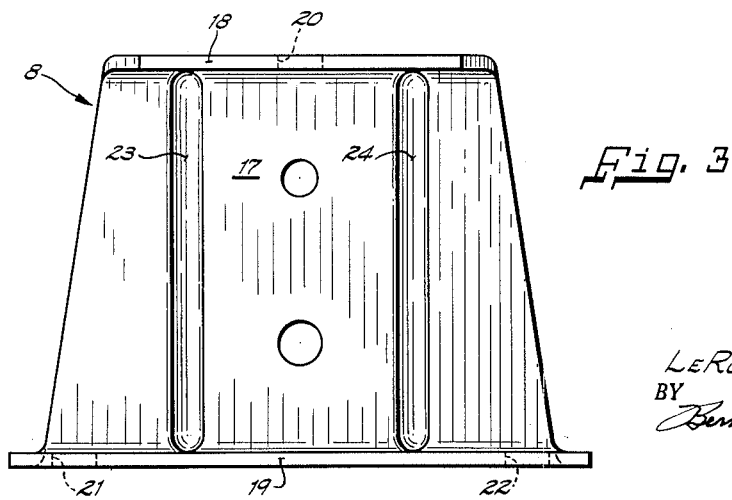
FIG. 3 is a front elevation of a deadend bracket embodying my invention.

Referring to FIGS. 2, 3 and 4, the bracket 8 will now be more specifically described. The preferred configuration of bracket 8 is as illustrated, namely, having a generally U-shaped cross section and provided with a substantially planar body 17 and a pair of arms 18 and 19 relatively spaced one from the other and extending laterally from and on one side of the planar body 17. The arms 18 and 19 are respectively provided with apertures 20, 21 and 22 to provide deadending points at which the electrical conductors 1, 2 and 3 can be secured by suitable deadending means as illustrated in FIG. 2. The apertures in the bracket arms are spaced to conform with the spacing of the electrical conductors 1, 2 and 3 established at the cable spacer 4, in order to provide deadending points for the respective electrical conductors. Thus, the alignment of the electrical conductors is maintained through the cable spacer to the deadend bracket, and the cable spacer 4 is not internally stressed as a result of the deadending. To strengthen the bracket 8 a pair of reinforcing ribs 23 and 24 may be provided in the planar body 17.

Referring to FIGS. 5 and 6 a second embodiment is shown using the system of this invention wherein a cable spacer 30, such as is shown and described in U.S. Patent 3,021,381, is used with a deadend bracket 31. Spacer 30 is supported by and depends from messenger cable 32 and establishes a predetermined equilateral spaced relationship between phase conductors 33 which are connected thereto by respective plastic ties 34.

The deadend bracket 31 has an angle member 36 with a pair of openings 37 therethrough that establish two deadending points. The cross bar 39, inclined, and channel 40 are welded together to form a unitary structure. Angle member 36 has a tab 36' which is pierce extruded from the material of member 36 and engages the cross bar 39 in the assembled condition to prevent rotation of member 36 with respect to the cross bar and inclined channel. The strap 41 which presents the third deadending point 42 is secured through a turned end portion to the lower depending portions of channel 40 by the through bolt 43. Through bolt 44 supports the angle member 36 and carries the principal tensil load. The deadend bracket 31 is constructed to present deadending points having the same spaced relation and orientation as established by the adjoining spacer 30 to maintain the alignment of the cables and minimize the load carried by the spacer.

In short circuit tests to determine the short circuit rating of an aerial cable system a 120-foot span was used with deadends at each end thereof, as taught in this specification, which maintained the conductor spacing established by the spacers. Spacers were positioned 30 feet from each deadend and at the center point of the span. Fault current loads were applied of progressively greater severity which initially caused no damage and resulted only in a temporary elongation and sag of the conductors due to heating. Progressively increasing severity of the fault condition caused damage as chipping or cracking of the end spacers only, thereafter destruction of the end spacers without damage to the midpoint spacer occurred, and finally in the most severe tests the loading caused total destruction of all spacers. The use of five spacers, rather than three, to provid support at 20-foot intervals along the span resulted in the destruction of all spacers at a lower severity fault current level than was the case when only three spacers were used.

It should be understood that the illustrated cable spacers are merely exemplary of spacers which can be used in an aerial cable system to achieve a particular spaced arrangement of electrical conductors and that my invention is equally well suited to any type of aerial cable spacer system, regardless of the positioning of the electrical conductors established by the cable spacer. In other words, the positioning of the three deadending points may be varied in any manner to conform with the spacing of the conductors and still come within the scope of my invention.

Accordingly, it is intended in the appended claims to cover all modifications and embodiments of my invention and as fall within the true spirit and scope thereof.

I claim:

1. A deadending system for a high voltage aerial cable system comprising three stranded conductors; a midspan cable spacer engaging said conductors to establish a triangular spaced relation therebetween; a deadend bracket presenting three deadending points having the same triangular spaced relation as established by said spacer; means securing said conductors respectively to said deadending points and means fixedly securing said deadend bracket to a supporting structure to maintain said conductors between said bracket and said spacer in substantially parallel relation to one another whereby the strain on said spacer next adjoining said bracket is minimized.

2. A deadending system for a high voltage reduced insulation aerial cable system comprising a supporting messenger cable; three stranded electrical conductors; a midspan spreader connected to and depending from said messenger cable and presenting three conductor engaging portions having a predetermined triangular spaced relation therebetween; means respectively connecting one of said conductors to each of said conductor engaging portions; a deadending bracket presenting three deadending points having a triangular spaced relationship therebetween similar to that established by the conductor engaging portions of said spacer; connecting means for respectively securing said conductors to said deadending points, said spacer and said bracket providing adjoining positions of support for said conductors and means fixedly supporting and orienting said bracket whereby said conductors extend from said spacer to said bracket in substantially parallel relation to one another minimizing the strain on said spacer.

3. A deadending system for a high voltage reduced insulation aerial cable system comprising a supporting messenger cable; three stranded electrical conductor cables; a deadend bracket presenting three deadending points in equilateral triangularly spaced relation; a cable spacer supported by said messenger and depending therefrom, said spacer presenting three conductor cable engaging portions having the same triangular spaced relation and orientation as said deadending points; and means respectively securing one of said cables to each of said spacer cable engaging portions, said conductor cables each supported successively by said deadend bracket and said spacer and extending between said bracket and spacer in parallel triangularly spaced relation to one another.

4. A deadending system for a high voltage reduced insulation aerial cable system comprising three relatively stiff insulated, stranded conductor cables; a cable spacer having triangularly spaced conductor cable engaging portions with said conductor cables respectively connected thereto to position said conductor cables in a triangularly spaced configuration; a deadend bracket presenting three deadending points having the same triangularly spaced relation and orientation as said spacer; and electrical insulating connecting means disposed at each of said deadending points with each respectively supportingly interconnecting said deadend bracket and one conductor cable end portion, said conductor cables extending between said spacer and said bracket in mutually parallel spaced triangular configuration.

5. A deadending system for a high voltage reduced insulation aerial cable system comprising a supporting messenger cable; three stranded electrical conductor cables; a spacer connected to and depending from said messenger cable and supportingly engaging said conductor cables to establish a predetermined triangularly spaced relation therebetween; a deadend bracket presenting three deadending points having a spaced triangular relation therebetween conforming to that established by said spacer; and connecting means carried by said deadend bracket at each of said three deadening points for respectively supportingly connecting and electrically insulating one of said conductor cables at each of said deadending points, said conductor cables extending between the successive locations of support established by said spacer and said deadend bracket in triangularly spaced mutually parallel relation to one another.

References Cited by the Examiner

UNITED STATES PATENTS

| | | |
|---|---|---|
| 2,082,566 | 6/1937 | Berndt. |
| 2,710,888 | 6/1955 | Edwards _____ 174—79 X |
| 2,912,482 | 11/1959 | Horrocks et al. _____ 174—146 |
| 3,021,381 | 2/1962 | Wengen _____ 174—146 |

OTHER REFERENCES

A. A. Hall, Jr., "Insulated Open Wire Cuts Costs," Electrical World, Sept. 16, 1957, pages 101–103.

JOHN F. BURNS, *Primary Examiner.*

JOHN P. WILDMAN, E. JAMES SAX, *Examiners.*